US006775698B1

United States Patent
Simone

(10) Patent No.: US 6,775,698 B1
(45) Date of Patent: *Aug. 10, 2004

(54) APPARATUS AND METHOD FOR DOWNLOADING CORE FILE IN A NETWORK DEVICE

(75) Inventor: Giovanni Di Simone, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/753,308

(22) Filed: Dec. 29, 2000

Related U.S. Application Data

(63) Continuation of application No. 08/988,770, filed on Dec. 11, 1997.

(51) Int. Cl.[7] .............................................. G06F 15/16
(52) U.S. Cl. ...................... 709/221; 709/239; 709/245; 714/5; 714/15; 714/20; 714/24; 714/54; 714/4; 714/43; 713/310; 713/313; 707/202; 707/204
(58) Field of Search ................................ 709/221, 239, 709/245; 714/4, 5, 15, 20, 24, 54, 43; 713/310, 323; 707/202, 204

(56) References Cited

U.S. PATENT DOCUMENTS

| | | | | |
|---|---|---|---|---|
| 4,495,474 A | * | 1/1985 | Nishikawa et al. ............ 331/11 |
| 5,099,485 A | * | 3/1992 | Bruckert et al. ............ 371/68.3 |
| 5,241,672 A | * | 8/1993 | Slomcenski et al. ........ 395/600 |
| 5,291,600 A | * | 3/1994 | Lutz et al. ................... 395/700 |
| 5,463,772 A | * | 10/1995 | Thompson et al. |
| 5,517,646 A | * | 5/1996 | Piccirillo et al. ........... 395/700 |
| 5,533,193 A | * | 7/1996 | Roscoe |
| 5,551,043 A | * | 8/1996 | Crump et al. |
| 5,633,999 A | * | 5/1997 | Clowes et al. .......... 395/182.04 |
| 5,682,471 A | * | 10/1997 | Billings et al. |
| 5,682,499 A | * | 10/1997 | Bakke et al. |
| 5,734,816 A | * | 3/1998 | Niijima et al. |
| 5,764,999 A | * | 6/1998 | Wilcox et al. |
| 5,768,599 A | * | 6/1998 | Yokomizo |
| 5,815,702 A | * | 9/1998 | Kannan et al. .............. 712/244 |
| 5,872,966 A | * | 2/1999 | Burg |
| 5,903,766 A | * | 5/1999 | Walker et al. .......... 395/750.05 |
| 5,920,257 A | * | 7/1999 | Commerford |
| 5,935,262 A | * | 8/1999 | Barrett et al. ................ 714/146 |
| 5,943,507 A | * | 8/1999 | Cornish et al. ............. 395/868 |
| 5,974,426 A | * | 10/1999 | Lee et al. .................... 707/202 |
| 5,995,745 A | * | 11/1999 | Yodaiken |
| 6,006,331 A | * | 12/1999 | Chu et al. |
| 6,021,408 A | * | 2/2000 | Ledain et al. |
| 6,032,236 A | * | 2/2000 | Honda ......................... 711/162 |
| 6,038,633 A | * | 3/2000 | Tavallaei |
| 6,067,407 A | * | 5/2000 | Wadsworth et al. |
| 6,128,627 A | * | 10/2000 | Mattis et al. |
| 6,175,904 B1 | * | 1/2001 | Gunderson ................... 711/162 |
| 6,202,090 B1 | * | 3/2001 | Simone |

(List continued on next page.)

*Primary Examiner*—Rupal Dharia
*Assistant Examiner*—Stephan Willett
(74) *Attorney, Agent, or Firm*—Marger Johnson & McCollom, PC

(57) ABSTRACT

A router stores core file into a local flash memory after detecting a shutdown event. In order to increase the amount of core file data that can be stored, the core file is first compressed before being downloaded into the local flash memory. Because the flash memory is local, the network device is not required to dump the core file over an external network to an external network server. Thus, network interface elements in the network device do not have to be functional in order for the core dump to be successful. During the shutdown routine, interrupts are disabled for all processing elements that are not needed to perform the core download. The core dump is therefore faster and more reliable and allows more effective system debugging than present core download procedures.

15 Claims, 3 Drawing Sheets

U.S. PATENT DOCUMENTS 6,226,761 B1 * 5/2001 Berstis .................. 714/37
6,298,410 B1 * 10/2001 Jayakumar et al.
6,366,987 B1 * 4/2002 Tzelnic et al.
6,430,703 B1 * 8/2002 Connor et al. ............ 714/20
6,553,513 B1 * 4/2003 Swoboda et al.
6,574,693 B1 * 6/2003 Alasti et al.
6,631,480 B2 * 10/2003 Zeigler et al. ............ 714/20
6,662,310 B2 * 12/2003 Lopez et al. ............. 714/15

* cited by examiner

APPARATUS AND METHOD FOR DOWNLOADING CORE FILE IN A NETWORK DEVICE

This application is a continuation of U.S. application Ser. No. 08/988,770, filed Dec. 11, 1997 and which is herein incorporated by reference.

BACKGROUND OF THE INVENTION

This invention relates to a method and apparatus for debugging faults occurring in a router or other network device and more particularly to compressing core file and storing the compressed core file into an internal flash memory.

Network servers and other types of network devices often experience unrecoverable faults. One example of an unrecoverable fault occurs when a routine writes an invalid address value into core memory. When a process tries to access the illegal address value, a fault occurs. For example, a process may request a memory address for a status register used for conducting a direct memory access (DMA) operation. If the memory address is invalid, a fatal error occurs when the process attempts to access the memory address, which causes the router to reset.

Viewing core files is vital to resolving fatal fault errors. A core file is essentially a copy of DRAM which contains the program, program pointers, program variables, etc. The core file provides a snap-shot of the router at the time the fault occurred. DRAM is used to meet performance requirements of the system and since the contents of the DRAM are destroyed after a reset operation, the core file must be downloaded to another storage device. Routers can be equipped with some flash memory. However, due to the cost of flash memory, the flash memory is not large enough to hold all DRAM contents. Thus, the core file must be downloaded to an external server connected to the router through a local area network (LAN). The core file can then be analyzed by an engineer from a computer or workstation to identify the source of the fault.

The problem with copying a core file to an external device is that the fault condition causing the router to shutdown may be caused by a process that must be operational in order to download the core file. For example, the fault may be caused by a software error with a network protocol or LAN media drivers. If these network interface processes are not operational, the core file cannot be successfully downloaded to an external network device. Thus, in the past, a special image had to be created in order to investigate the fault. The special image is produced by modifying operating code to print out specific identified information before the fault occurs. Generating special images to locate faults requires a large amount of trial and error which is extremely time consuming. Alternatively, the router is taken out of production so that the current content of the main memory can be analyzed with a ROM monitor.

Accordingly, a need remains for a faster more reliable way to save core file after a fault condition occurs in a network device.

SUMMARY OF THE INVENTION

A network device, such as a router or switch, downloads a core file into a local flash memory. In order to increase storage capacity, the core file is compressed before being dumped into the local flash memory. The flash memory is local and internal to the network device. Because network interface elements do not have to be functional for a successful core download, the core download is faster and more reliable than existing download techniques.

In one embodiment, the network device comprises a router having a CPU for controlling packet processing operations. DRAM is used for a main memory and its contents constitutes the core file. Network interface elements are coupled between the CPU and different external networks. The network interface elements process and route the packets received from the external networks. The core file is downloaded from the main memory to local flash memory independently of these network interface elements.

During the shutdown routine, interrupts are disabled for any processing elements, such as the network interface elements, that are not needed to perform the core download. Thus, the CPU is not interrupted by routines that could generate additional fault conditions. Because these processing elements are disabled, the DRAM contents cannot be modified by other processes that might be operating after the fault condition. Thus, the core file will more accurately represent a snapshot of the system at the time the fault condition occurred.

In one embodiment of the invention, the CPU downloads the core file to the same local flash memory used for storing the router operating routine and the router shutdown routine. Router platforms may contain more than one flash memory device and different flash memory configurations. The network device can also be configured by a user to download all or part of the core file into one or more of the different flash memory devices used in the specific platform.

In order to increase download capacity, each byte of the core file is compressed using a standard compression routine. The compressed core file is written into a temporary buffer in main memory. Once the temporary buffer is full, the contents of the buffer are downloaded into the local flash memory.

The router is coupled to a network server through a LAN. The router is reset after completing the core download. The server uses a file transfer operation to access the router and read the core file from local flash memory. The core file is then analyzed to determine the state of the router when the shutdown event occurred.

The foregoing and other objects, features and advantages of the invention will become more readily apparent from the following detailed description of a preferred embodiment of the invention which proceeds with reference to the accompanying drawings.

DETAILED DESCRIPTION

Figure 1:
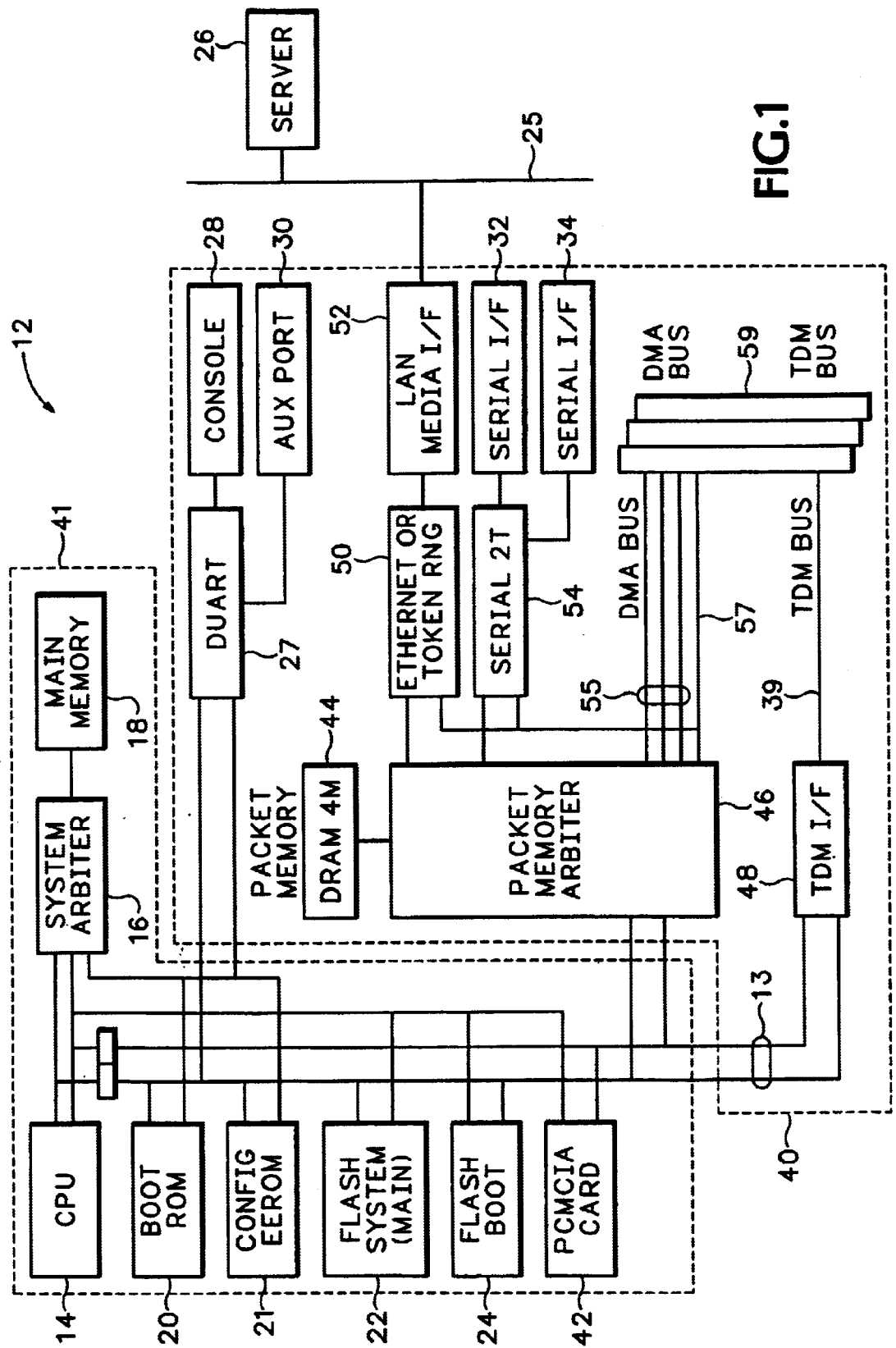
FIG. 1 is a block diagram of a network device according to one embodiment of the invention.

Referring to FIG. 1, a network device 12 is shown in dashed boxes 40 and 41 and is coupled to a LAN 25. A network device is defined as any system that processes data or communicates through a network. In one embodiment of the invention, the network device 12 comprises a router that processes and transfers network packets to and from different external devices on different networks or buses. A server 26 is coupled to the router 12 through the LAN 25. The router 12 includes a CPU 14 coupled through an internal bus 13 and a system arbiter 16 to a main memory 18. The main memory 18 comprises a Dynamic Random Access Memory (DRAM). Multiple memory devices are coupled to bus 13 and include a flash/Read Only Memory (ROM) 20 used for router bootup, an Electrically Erasable Read Only Memory (EEROM) 21 used for configuring the router 12, and flash memories 22 and 24 used for storing router routines. A PCMCIA card 42 connects the router 12 to PCMCIA compatible devices (not shown).

Multiple network interface elements are shown in dashed box 40 and are used to connect the router 12 to different networks. In the example shown in FIG. 1, the network interface elements 40 include a packet memory arbiter 46 that arbitrates access to a packet memory 44 between an Ethernet or token ring controller 50 and a serial bus controller 54. A LAN media interface 52 is coupled between LAN 25 and controller 50. Serial interfaces 32 and 34 are coupled between serial lines (not shown) and controller 54.

Three slots 59 are connected to data bus connections 55, a Direct Memory Access (DMA) bus 57 and a Time Division Multiplex (TDM) bus 39. Telephone line interface cards and modem cards (not shown) are coupled to the slots 59. Calls received by the telephone line interface card are coupled to the modems through the TDM bus 39 or sent over the DMA bus 57 to the packet memory arbiter 46. A console 28 accesses the internal bus 13 through a DUART 27. Other devices access the processing elements in router 12 through an auxiliary port 30 also coupled to the DUART 27. The network interface elements 40, CPU 14 and internal memory devices are referred to generally as processing elements.

The general operation of the processing elements described in FIG. 1 are known to those skilled in the art and are therefore not described in further detail. One router using the architecture shown in FIG. 1 is the Model No. 5200 router manufactured by Cisco Systems, Incorporated, 170 West Tasman Drive, San Jose, Calif.

Figure 2:
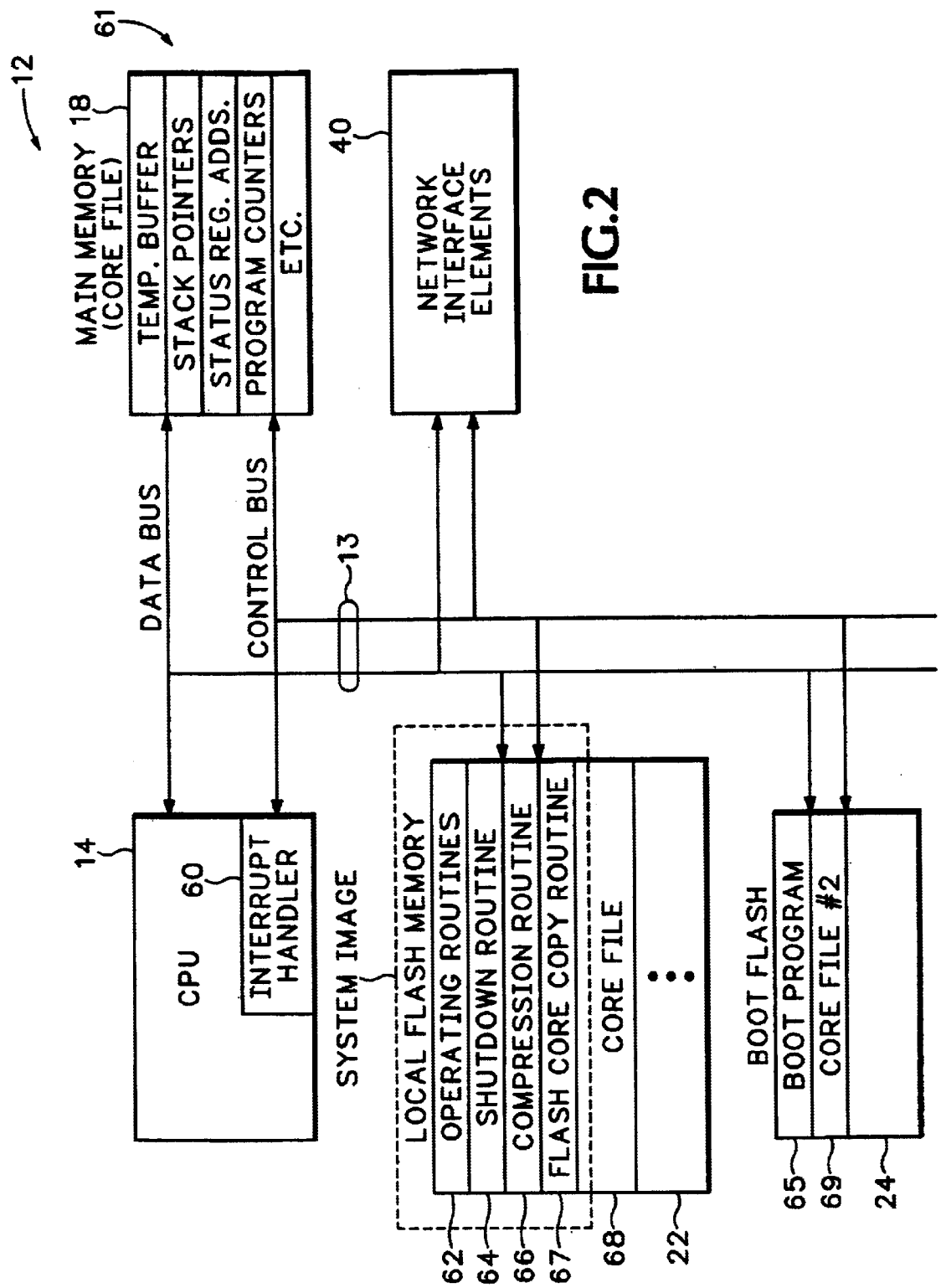
FIG. 2 is a detailed diagram of processing elements in the network device shown in FIG. 1.

Referring to FIG. 2, the CPU 14 includes an interrupt handler 60 that receives interrupt requests from the different processing elements in the router 12. The interrupt handler 60 jumps to different routines that service the interrupt requests made by the different processing elements. Interrupt handlers are well known and are, therefore, not described in further detail. The main memory 18 stores the information that constitutes the core file for the router 12. Core file 61 includes the values of stack pointers, routine variables, the last operating instruction, values set by the last operating instruction, status register addresses, program counters and any other data stored in the main memory 18.

The local flash memory 22 stores a system image that includes operating routines 62, a shutdown routine 64, a compression routine 66 and a flash core copy routine 67. The operating routines 62 include bootup routines, routing protocols, device drivers, configuration routines, etc. and any other routines used by the router to process data. The CPU 14 starts the shutdown routine 64 after detecting a shutdown event. The shutdown routine 64 uses the flash core copy routine 67 to download the contents of main memory 18 to local flash memory 22. The flash core copy routine 67 also calls the compression routine 66 that compresses the contents of main memory 18 before being downloaded to local flash memory 22. The boot flash memory 24 contains a boot program 65 used by the router 12 to boot the operating routine 62 after a reset. The flash core copy routine 67 can alternatively copy part of the core file 61 into a portion of the boot flash memory 24 (core file #2).

During initial configuration of the router 12, space is preallocated in main memory 18 for a temporary buffer and memory required for compression routines. If space in main memory 18 is allocated to other processes, the CPU 14 might not be able to successfully allocate space in main memory 18 for the temporary buffer when a shutdown event occurs. By preallocating space in main memory 18, the flash core copy routine 67 is assured of having sufficient space for compressing and downloading core file 61.

Because volatile DRAM is used for the main memory 18, the contents of the main memory 18 are lost any time the router 12 is reset. Shutdown events causing a reset occur for any one of a variety of software or hardware faults. For example, a shutdown event occurs when a process loads an invalid address into main memory 18. When another process tries to use the invalid address, a bus error occurs causing the interrupt handler 60 to call the shutdown routine 64.

If the shutdown routine attempts to download the core file 61 to server 26 (FIG. 1) via a FTP command, the network interface routine used to conduct the FTP operation may be the same routine causing the fault. The CPU 14 would then be unable to successfully download the core file 61 to server 26.

The flash core copy routine 67 according to the present invention solves this problem by downloading the core file 61 to non-volatile local flash memory 22. Thus, the contents of the core file 61 will not be destroyed when the router 12 is reset. Because the flash core copy routine 67 downloads the core file to local memory, operational status of network interface routines and devices will not affect the core file download process.

The flash core copy routine 67 disables interrupts for all processing elements in the router 12, other than those processing elements used for downloading the core file 61 into local flash memory 22. For example, the CPU 14 has multiple levels of interrupt priority. When a shutdown event occurs, the CPU 14 is brought up to a higher interrupt level ignoring interrupts at lower levels. Disabling interrupts keeps the CPU 14 from having to service requests generated by interface elements 40 while downloading the core file 61 into local flash memory 22.

Because other interrupts are disabled, the shutdown routine is not disrupted by the interface elements 40 or other processes. If not disabled, the data in main memory 18 could continue to be modified by the interface elements 40 after the shutdown event. By disabling all unnecessary processing elements, the core file provides a more accurate snapshot of the system at the time the system crash occurred.

Figure 3:
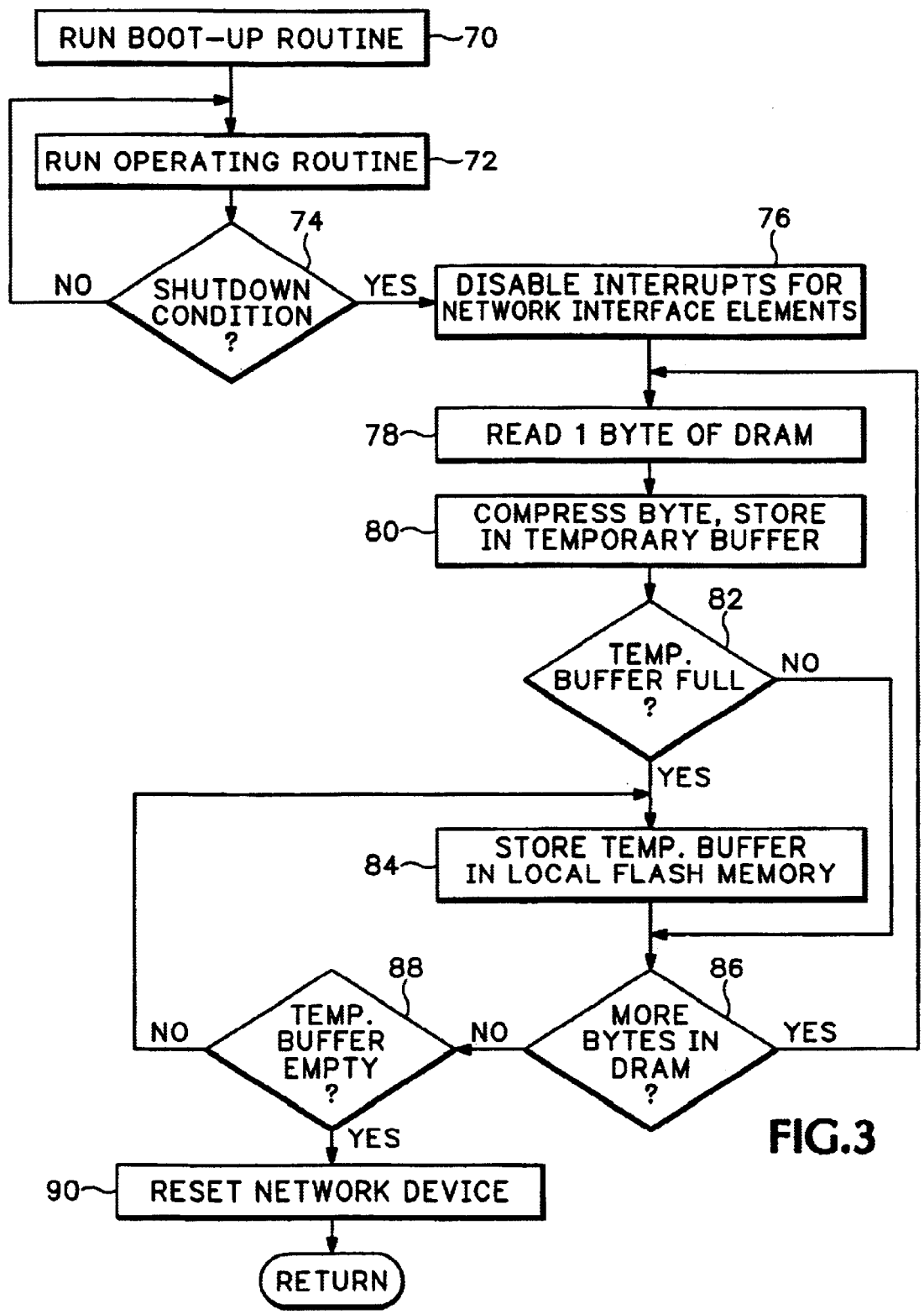
FIG. 3 is flow diagram showing how the network device operates according to the invention.

FIG. 3 describes how the flash core copy routine 67 downloads the contents of main memory 18 into local flash memory 22 according to the invention. The CPU 14 in step 70 runs a standard boot routine 65 in ROM/FLASH memory 20 that boots an operating routine. Step 72 runs the operating routine. After an instruction is completed in the operating routine, the CPU 14 checks for interrupts from any one of the processing elements in the router 12. If an interrupt request is detected, the CPU 14 services the interrupt then continues running the operating routine in step 72.

If a fatal error occurs in decision step 74, the CPU 14 first stores the address location of the operating routine on a program stack pointer. The address pointer for the shutdown routine 64 is read by the CPU 14. In step 76, the shutdown routine 64 calls the flash core copy routine 67 which disables the interrupts for the network interface elements 40 and any other processing elements that are not needed to download the contents from main memory 18 to local flash memory 22.

The flash core copy routine 67 reads 1 byte from the DRAM 18 in step 78. Step 80 uses the compression routine 66 to compress and store the compressed byte from DRAM 18 into the temporary buffer in main memory 18. If the temporary buffer is full in decision block 82, the compressed data in the temporary buffer is downloaded into the local flash memory 22 in step 84. Any standard compression routine, such as compression routines using a standard hash algorithm, can be used to compress the core file. One hash based compression routine is explained in U.S. Pat. No. 4,558,302 to Welch.

After the temporary buffer is downloaded into flash memory in step 84, or if the temporary buffer is not full in decision step 82, decision step 86 determines whether there are any more bytes in the main memory DRAM 18. If all bytes of the main memory 18 have been compressed, any remaining compressed data in the temporary buffer is downloaded into local flash memory in decision step 88. If there is more data in main memory 18, decision step 86 reads the next byte in step 78.

The compressed core file 61 can be loaded into the same local flash memory 22 that stores the operating routine 62 and the shutdown routine 64. Part or all of the compressed core file can also be stored in boot flash memory 24. If there is insufficient space in local flash memories 22 and 24, the flash core copy routine 67 stores as many 4K blocks of compressed core file 61 as possible. The remainder of the core file 61 is then downloaded word by word until there is no more space available in the local flash memories. After the compressed core file 61 is downloaded into local flash memory 22, and possibly flash memory 24, the router 12 is reset in step 90.

Usually after the router 12 is reset, the previous fault condition causing the shutdown no longer exists. The compressed core file 61 in local flash memory 22 can then be transferred over LAN 25 using an internet protocol command initiated from the server 26 or router 12. However, if the network command fails, the compressed core file 61 in local flash memory 22 can be accessed through the console 28 or other devices coupled to auxiliary port 30.

Having described and illustrated the principles of the invention in a preferred embodiment thereof, it should be apparent that the invention can be modified in arrangement and detail without departing from such principles. I claim all modifications and variations coming within the spirit and scope of the following claims.

What is claimed is:

1. A system for saving an entire core file in a network routing or switching device connected to an external network by an external interface, comprising:

means for monitoring the network device for a shutdown event;

means for conducting a shutdown routine after detecting the shutdown event, the shutdown routine avoiding all unnecessary internal and network operations while copying the entire core file including the values of stack pointers, routine variables, a last operating instruction, values set by the last operating instruction, status register addresses, program counters and any other data stored in a main memory into a local memory internal to the network device and coupled directly to the main memory by a same internal bus that couples the local memory to a central processing unit while avoiding transferring any of the core file through the external interface to the external network and preventing transfer of the core file to any other device not coupled directly to the internal bus or to any device that needs a driver to receive data from the main memory; and means for storing the core file that identifies a cause of the shutdown event from the main memory to the local memory before completing the shutdown event, before resetting the network device and without using any external interface or device driver to store the core file.

2. A system according to claim 1 wherein the local memory comprises either local flash memory or boot flash memory and the main memory comprises random access memory.

3. A system according to claim 1 including means for compressing the core file and copying the compressed core file into the local memory.

4. A system according to claim 3 including the following:

means for resetting the network device;

means for preallocating a temporary buffer in a main memory comprising dynamic random access memory for temporarily storing the core file; and means for storing the core file in the preallocated temporary buffer of the main memory.

5. A system according to claim 4 including means for storing a network device operating routine, the shutdown routine and the core file all in the local memory.

6. A system according to claim 4 including the following:

means for reading portions of the core file;

means for compressing the portions of the core file using a compression routine;

means for storing the compressed core file into a temporary buffer in a main memory comprising dynamic random access memory; and means for writing all the compressed core file in the temporary buffer into the local memory when the temporary buffer is full.

7. A system according to claim 1 including means for disabling interrupts from all processing elements in the network device except those processing elements necessary to download the core file into the local memory including disabling interrupts and disabling drivers for all devices coupled to the network device.

8. A system according to claim 7 wherein means for disabling the interrupts comprises increasing the interrupt priority level for a central processing unit so that interrupts from other processing elements in the network device are ignored while copying the core file into the local memory.

9. A system according to claim 1 wherein the shutdown event comprises a fatal error that prevents the network device from effectively communicating with the external server.

10. A system according to claim 1 wherein the network device comprises a router for routing data over a local area network coupled to an external server through the local area network.

11. A system according to claim 10 further comprising:

means for resetting the router after the shutdown event;

means for accessing the router through the external server; and means for transferring the core file from the local memory of the network device to the external server through an internet protocol operation.

12. A system for saving a core file in a network router for routing data in a network, the network router coupled to an external network via network interface elements, comprising:

means for monitoring the network router for a fatal error;

means for disabling interrupts from the network interface elements in the router after detecting the fatal error;

means for reading bytes of the core file in a main memory one at a time;

means for compressing the bytes;

means for storing the compressed bytes into a temporary buffer in the main memory;

means for writing blocks of the compressed bytes into a local memory when the temporary buffer in the main memory is full;

means for resetting the router after downloading the core file into the local memory; and means for outputting the core file from the local flash memory through the network interface elements to an external network device coupled to the router, the core file output from the local flash memory containing a state of the router at the time the fatal error occurred.

13. A system for downloading a core file in a network device connected to an external network via an external interface, comprising:

means for monitoring the network device for a shutdown event;

means for conducting a shutdown routine after detecting the shutdown event, the shutdown routine copying the core file into a local memory internal to the network device instead of transferring the core file through the external interface to the external network;

means for allowing a user to select either local flash memory or boot flash memory as the local memory; and means for storing the core file in the local memory that identifies a cause of the shutdown event.

14. A system according to claim 13 including:

means for preallocating a temporary buffer in a main memory comprising dynamic random access memory for temporarily storing the core file; and means for storing the core file in the preallocated temporary buffer of the main memory.

15. A system according to claim 14 including:

means for reading portions of the core file;

means for compressing the portions of the core file using a compression routine;

means for storing the compressed core file into the temporary buffer in the main memory; and means for writing all the compressed core file in the temporary buffer into the local memory when the temporary buffer is full.

* * * * *

UNITED STATES PATENT AND TRADEMARK OFFICE
CERTIFICATE OF CORRECTION

| | |
|---|---|
| PATENT NO. : 6,775,698 B1 | Page 1 of 1 |
| DATED : August 10, 2004 | |
| INVENTOR(S) : Simone | |

It is certified that error appears in the above-identified patent and that said Letters Patent is hereby corrected as shown below:

Title page, Item [54] and Column 1, lines 1-3,
"APPARATUS AND METHOD FOR DOWNLOADING CORE FILE IN A NETWORK DEVICE" should read -- APPARATUS AND METHOD FOR IDENTIFYING FAULT CONDITIONS AND SAVING A CORE FILE IN A NETWORK DEVICE --.
Item [56], References Cited, U.S. PATENT DOCUMENTS, "5,932,262 A 8/1999 Barrett et al.…..714/146" should read -- 5,935,262 A 8/1999 Barrett et al.…..714/46 --.

Column 5,
Lines 53-54, "avoiding all unnecessary internal and network operations" should read -- avoiding all network operations --.

Signed and Sealed this

Twenty-sixth Day of July, 2005

JON W. DUDAS
*Director of the United States Patent and Trademark Office*